Patented Dec. 2, 1941

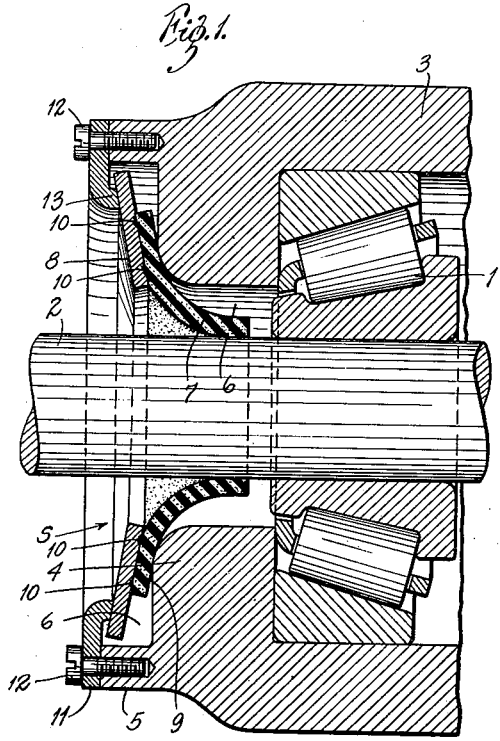
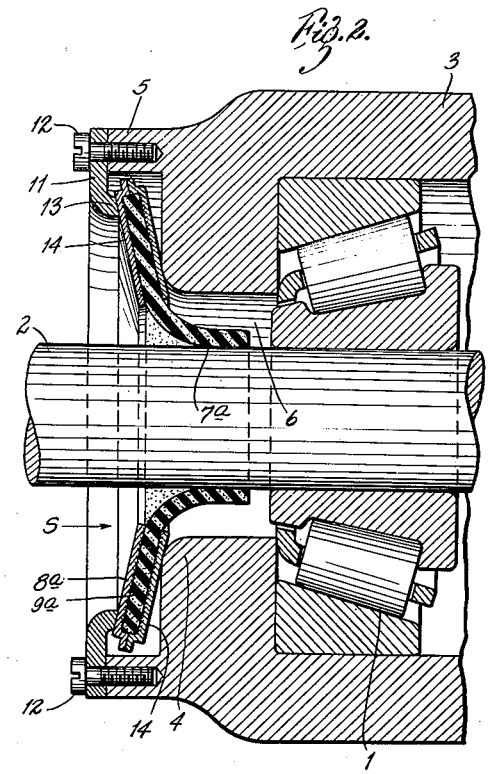
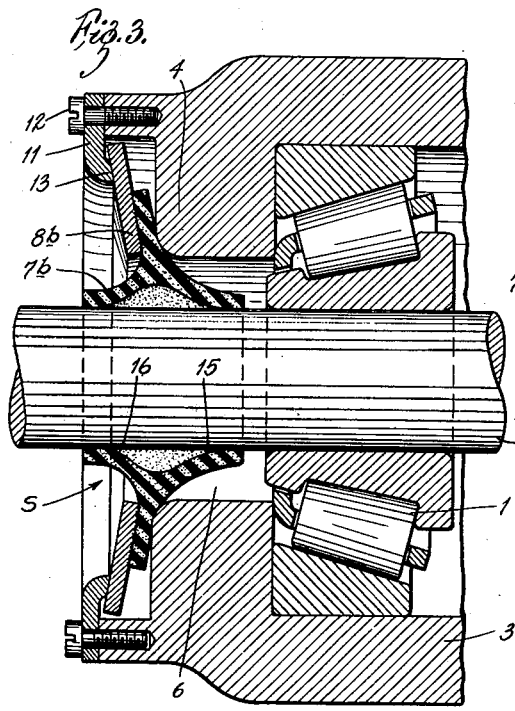
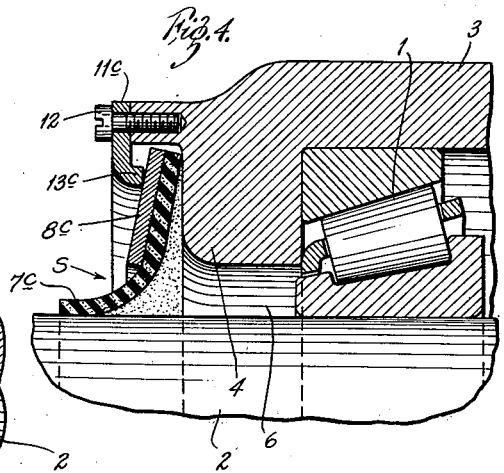

2,264,413

UNITED STATES PATENT OFFICE 2,264,413

SEAL

Walter Siegerist, St. Louis, Mo.

Application December 21, 1939, Serial No. 310,285

5 Claims. (Cl. 286—5)

This invention relates to devices for preventing the escape of oil or grease from bearings. The principal objects of the present invention are to devise a seal of simple and inexpensive construction which will seal the bearing housing and the shaft, which will be easy to install and remove, which will require but little space and be efficient in operation, which will provide for the taking up of wear in the seal, and which will reduce the necessity for accurate machining of the closure parts. The invention consists in the sealing device and in the parts and combinations and arrangements of parts hereinafter described and claimed.

In the accompanying drawing, wherein like reference numerals refer to like parts wherever they occur, Fig. 1 is a longitudinal sectional view of a sealing ring emboding my invention and a bearing interposed between a housing and a shaft.

Fig. 2 is a longitudinal sectional view of a modified form of sealing ring,

Fig. 3 is a view similar to Fig. 2 of another modified form of sealing ring.

Fig. 4 is a view similar to Fig. 2 of another modified form of sealing ring.

In the construction illustated in the drawing, a bearing seal, indicated generally by S, is shown as applied to a roller bearing construction having a taper roller bearing 1 interposed between a rotary shaft 2 and a housing 3. However, the seal may be applied to constructions having other types of bearings.

In the construction illustrated in Fig. 1, the housing 3 has an end wall 4 having its lower edge preferably rounded. A projecting annular flange 5 at the end of the housing forms a pocket 6 which is adapted to receive the seal S, said pocket having a greater diameter and width than the outside diameter and the width of said seal.

The sealing device S comprises a flaring sealing ring or sleeve 7 of suitable elastic material which overlaps a portion of a frusto-conical supporting ring 8, of steel or other suitable material. While this supporting ring is preferably solid, it may be perforated or slotted if desired. The overlapping portion 9 of the sealing sleeve is vulcanized or cemented to the supporting ring at 10, adjacent to the peripheral portion of the sealing sleeve and also adjacent to the central opening of the supporting ring. If desirable, the entire overlapping portion of the sealing sleeve may be cemented or vulcanized to the supporting ring. The outside diameter of the supporting ring is larger than the outside diameter of the sealing sleeve, and the outside diameter of the sealing member is slightly larger than the diameter of the central opening of the supporting ring. The sealing sleeve has a central opening whose diameter is the same as or, preferably, slightly less than the diameter of the shaft which extends therethrough and the central opening of the supporting member has a larger diameter than the shaft.

The sealing sleeve 7 of the seal extends from the supporting ring over the edge of the end wall and into the hollow of said end wall. The supporting ring 8 of the seal is positioned in the pocket and is retained therein by a collar 11 or other suitable holding means secured to the housing flange 5 by screws 12, said collar having an inturned flange 13 adapted to contact the inside of the supporting ring 8 and thereby hold the seal within the pocket. The seal is positioned by the engagement of the sealing sleeve with the shaft and the edge of the end wall of the housing and by the engagement of the collar flange with the supporting ring.

The preferred material for the elastic sealing member is a treated rubber or a syntheic rubber such as those known under the commercial names of "Neoprene" and "Thiokol" or a suitable plastic, such as "Lucite." These materials are elastic and resistant to the heat to which oil seals are ordinarily exposed in service, they are resistant to acid, water, grit and dirt, and they maintain their flexibility and elasticity throughout the range of temperatures occurring in service.

Obviously, the seal may be split and spliced to obtain the same effect as obtained with continuous rings. This is necessary to place the seal on the inside of a bearing without removing the bearing from the shaft.

The operation of my device is as follows: The seal S is mounted on the shaft 2 with the supporting ring 8 of the seal disposed in the pocket 6 of the housing 3 and the sealing sleeve 7 extending beneath the end wall 4 of the housing. The inturned flange 13 on the collar 11 presses against the inside of the supporting ring 8, tensioning the seal. By reason of the elastic sealing member having a central opening of smaller diameter than the shaft, the elasticity of the sealing member maintains close contact with the shaft and prevents the escape of oil or grease from the bearing. The shaft is thereby effectively sealed with a minimum of rubbing pressure on the sealing sleeve 7. In addition to the sealing of the shaft, my seal provides a positive seal against the housing. As positioned, the outer portion 9 of the sealing sleeve 7 overlapping the supporting ring 8 presses against the end wall 4 of the housing thereby forming a seal. Increased pressure on the supporting ring 8 moving the collar toward the end wall of the housing has the double effect of tightening the seal against the housing and of taking up wear in the sealing sleeve adjacent to the shaft. The shape of the seal makes it possible to take up a great amount of wear without the necessity of replacing the seal. Further, considerable pressure can be exerted against the housing to maintain an effective seal at the point of contact.

In the modification shown in Fig. 2, the seal comprises a double walled supporting ring 8a. The outer portion 9a of the sealing sleeve 7a which is similar to that described above is held between the walls 14 of the supporting ring 8a. The outer portion 9a of the sealing sleeve 7a is cemented or vulcanized to the inner sides of the walls 14. This seal operates in a manner similar to that heretofore described, except that the end wall 4 of the housing is sealed by a wall 14 of the supporting ring rather than by the outer portion of the sealing sleeve.

In the modification shown in Fig. 3, the seal comprises a supporting ring 8b as in Fig. 1. Partially overlapping said supporting ring and cemented or vulcanized thereto, is a flaring bifurcated elastic sealing ring or sleeve 7b having divergent sleeve portions extending along the shaft. One of the sleeves 15 extends beneath the end wall 4 of the housing and serves principally to retain the oil or grease. The other sleeve 16 extends outwardly from the end wall of the housing and serves principally to exclude dirt and foreign matter from the bearing. The upper portion of the sealing sleeve 7b presses against the end wall of the housing to form a seal for the housing.

In the modification shown in Fig. 4, the supporting ring 8c and flaring sealing sleeve 7c are, in general, similar to those shown in Fig. 1, except that the outside diameter of the sealing sleeve 7c is greater than the sealing sleeve 7 shown in Fig. 1. In this modification, the sealing sleeve 7c is cemented or vulcanized to the inside of the supporting ring 8c and overlaps the entire face of the supporting ring. The seal is mounted with the inside of the supporting ring facing the end wall of the housing 4 and the sealing member extending outwardly from the end wall of the housing. The flange 13c on the collar 11c or other means used to position the seal presses against the outside of the supporting ring. The housing is sealed by the outer periphery of the sealing sleeve 7c pressing against the end wall 4 of the housing.

Obviously, other modifications may be made and I do not wish to be limited to the precise constructions shown.

What I claim is:

1. The combination of a shaft, a housing having an end wall whose inner periphery is spaced from said shaft to form an annular opening, a flange projecting longitudinally beyond said end wall to form with the outer face of said wall an annular pocket relatively wide radially and relatively narrow axially that communicates with said annular opening, a washer relatively wide radially and relatively thin axially, said washer being disposed in said pocket at a small angle with respect to the outer face of said wall, a sealing member of resilient material having one end surrounding said shaft within said annular opening and the other end thereof extending into said end pocket and being secured to said washer, and securing means on said housing engaging the outer face of said washer near the outer periphery thereof, said sealing member contacting said end wall adjacent to said opening and said sealing member and said washer being rockable thereagainst.

2. The combination of a shaft, a housing having an end wall whose inner periphery is spaced from said shaft to form an annular opening, a flange projecting longitudinally beyond said end wall to form with the outer face of said wall an annular pocket relatively wide radially and relatively narrow axially that communicates with said annular opening, a dished washer relatively wide radially and relatively thin axially, said washer being disposed in said pocket at a small angle with respect to the outer face of said wall, a sealing member of resilient material having a sealing sleeve portion surrounding said shaft within said annular opening and a flaring mouth portion, the outer part of said flaring portion extending into said end pocket and being secured to said washer, and securing means on said housing engaging the outer face of said washer near the outer periphery thereof, said sealing member contacting said end wall adjacent to said opening and said sealing member and said washer being rockable thereagainst.

3. The combination of a shaft, a housing having an end wall whose inner periphery is spaced from said shaft to form an annular opening, the portion of said end wall defining the outer end of said opening being rounded, a flange projecting longitudinally beyond said end wall to form with the outer face of said end wall an annular pocket relatively wide radially and relatively narrow axially that communicates with said annular opening, a frusto-conical washer relatively wide radially and relatively thin axially, said washer being disposed in said pocket at a small angle with respect to the outer face of said wall, a sealing member of resilient material having a sealing sleeve portion surrounding said shaft within said annular opening and a flaring mouth portion, the outer part of said flaring portion extending into said end pocket and being secured to said washer, and a retaining ring engaging the outer face of said washer near the outer periphery thereof, said sealing member contacting said end wall adjacent to said rounded portion and said sealing member and said washer being rockable thereagainst.

4. The combination of a shaft, a housing having an end wall forming an opening between the bottom of said end wall and said shaft, an annular flange defining a pocket outside of said end wall, a frusto-conical supporting ring in said pocket, a flaring sealing member of elastic material having a portion thereof overlapping a portion of said supporting ring, said sealing member having diverging sleeves for engaging said shaft and a portion of said sealing member abutting against the outer face of said end wall, said supporting ring and sealing sleeve being secured together, and means engaging said supporting ring to hold it in said pocket and to increase the sealing force of said sealing member against said end wall and said shaft.

5. The combination of a shaft, a housing having an end wall forming an opening between the bottom of said end wall and said shaft, an annular flange defining a pocket outside of said end wall, a double-walled, frusto-conical supporting ring with a recess between said walls in said pocket, a flaring sealing sleeve of elastic material having a portion engaging said shaft within the opening defined by said end wall and a portion of said sealing sleeve extending into said recess in said supporting ring, said supporting ring and sealing sleeve being secured together, said supporting ring abutting against said end wall, and means engaging said supporting ring to hold it in said pocket and to increase the sealing force of said supporting ring against said end wall and the sealing sleeve against said shaft.

WALTER SIEGERIST.